Patented Apr. 14, 1931

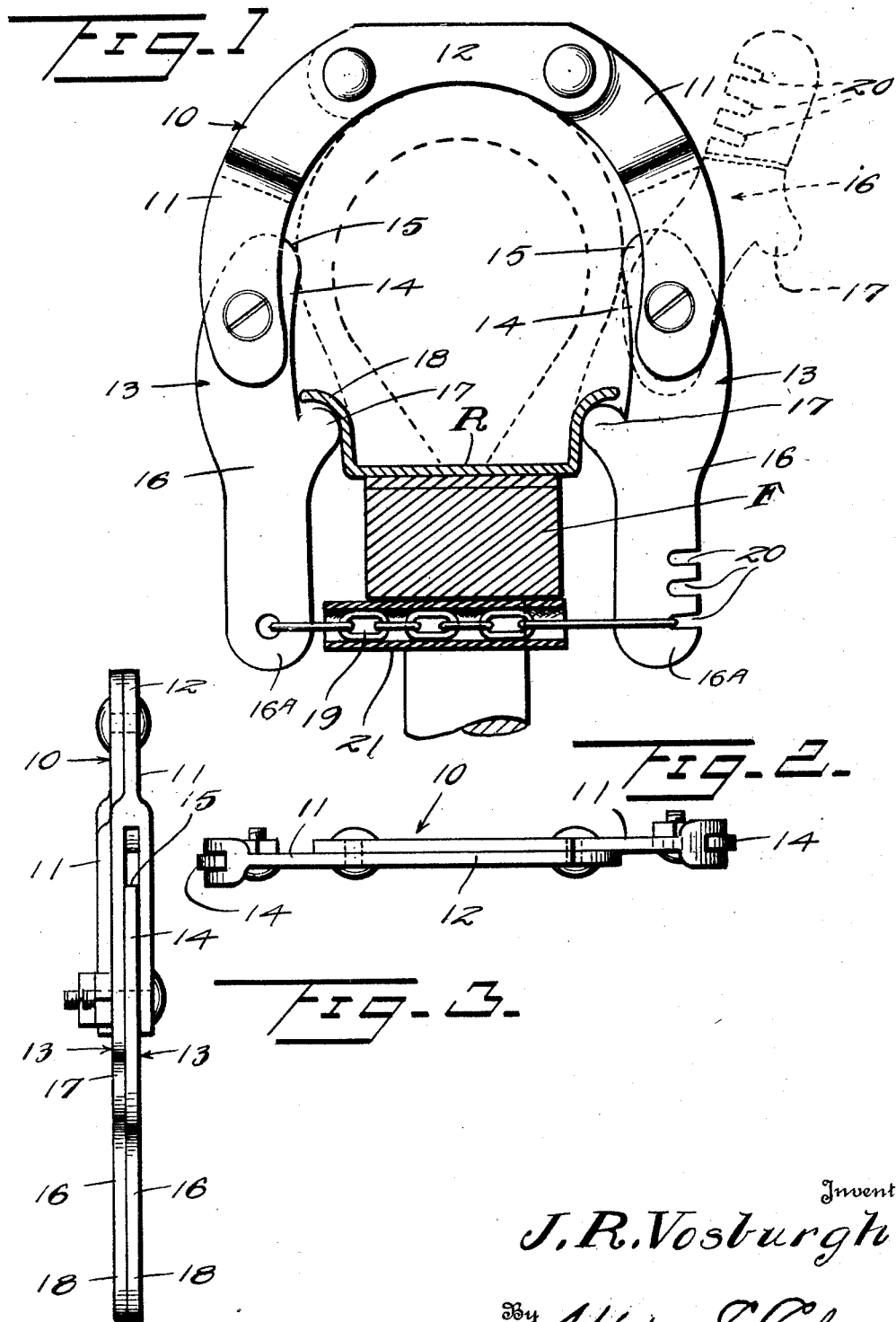

1,800,877

UNITED STATES PATENT OFFICE

JOHN R. VOSBURGH, OF JOHNSTOWN, NEW YORK

TRACTION DEVICE FOR VEHICLE WHEELS

Application filed April 6, 1927. Serial No. 181,516.

This invention relates to traction or antiskid devices for vehicle wheels and more particularly to a device of this character, which is adapted to automatically lock itself upon a vehicle tire of the pneumatic type.

A further object of the invention is to produce a device of this character which may be readily and cheaply manufactured, which is readily placed in position upon the wheel and which will be durable and efficient in service.

A further object of the invention is to provide a device of this character in which the resilient wall of the tire constantly acts to maintain the locking engagement of the traction device with the wheel rim thereof. Supplementary securing means have also been provided to augment the traction of my attachable tire cleat means.

These and other objects I attain by the construction shown in the accompanying drawings, wherein for the purpose of illustration is shown a preferred embodiment of my invention and wherein:

Figure 1 is a cross-sectional view of a wheel rim showing a traction device constructed in accordance with my invention applied thereto, the tire being indicated in dotted lines;

Figure 2 is a plan view of the traction device;

Figure 3 is a side elevation thereof.

Referring now more particularly to the drawings, the numeral 10 generally designates a horseshoe or U-shaped saddle adapted to straddle the tread of a pneumatic tire of a vehicle wheel. This saddle may if preferred be formed in two sections 11, adjacent ends of which overlap and are secured to one another to form the cross bar 12 of the U to fashion a reenforced unitary collet-like member. This thickens the cross bar, which, of course, contacts with the road and is accordingly subjected to considerable strain and wear. The respective arm extremities of the U-shaped member are each shown as bifurcated and within each such slot there is mounted a manipulative lever such as 13 pivoted intermediate its lever ends. Each of these complementary levers includes a tire engaging end leg portion 14, the nose or toe of which is rounded off into a smooth-cam-like toe member, as at 15, while the opposite lever leg is equipt with a rim engaging leg 16, the inner face of which is provided with a hook-like keeper lug or retaining protrusion 17 adapted to engage under one of the oppositely disposed or diverging overhung flanges 18 associated with the tire rim R whenever the device is in applied position. Each of the rim engaging lever legs 16 may further be provided with a tail 16A, of which one such may be permanently connected to a chain 19. The free end link of this chain is adapted to interchangeably engage in a series of notches 20 formed in the outer face of the corresponding tail of the other lever. The chain 19 serves as a supplementary securing means for my levers adapted to augment the holding of my tire collet attachment against displacement. Said chain passes under the felly F of the wheel to which the device is applied and is preferably covered by a tube of rubber, soft leather or the like, as indicated at 21.

In applying the device to the tire, the levers 16 are rotated about the pivots thereof until their respective rim engaging legs are most nearly adjacent the attached ends of the arms of the saddle as indicated in dotted outline. The saddle is then seated upon the tire whereupon the levers manually rotated about their respective pivots inwardly toward the rim flanges 18 thereof until the positions of the levers are reversed and brought into operative position as shown in full lines. It will be obvious that in order to accomplish this, the tire engaging ends of the levers must squeeze the side walls of the tire inwardly against inflated pneumatic pressure, so that after these levers have been moved a predetermined distance, they will snap into operative position and cause the retaining lugs 17 to grip beneath the respective rim flanges 18. To remove the device, the operation just described is reversed. When in applied position and the hook-like lugs 17 are brought into engagement with the rim flanges 18, the tire engaging legs 14 of the levers should have the toes thereof pressed firmly against the side walls of the tire, so that the internal pressure of the tire tends to constantly urge them outwardly and away from each other to maintain the engagement between said rim flanges and their cooperating lugs 17.

It will be obvious that the construction herebefore set forth is capable of a certain range of change and modification without materially departing from the spirit of the invention and I accordingly do not limit myself to such specific structure except as hereinbefore claimed.

I claim:—

1. In a traction device adapted to be attached to a vehicle wheel, the latter comprising a rim-like member serving to mount a tire therearound having resilient complementary side-walls, collet means including a jaw-like yoke element adapted in operative position to transversely straddle and embrace a portion of the tire tread, manipulative dual gripping levers respectively associated with the yoke end portions, said levers being adapted to reversely hook beneath said rim member and made relatively retractable by cooperative contact with the respective tire side-walls serving to yieldably urge said rim hooking lever portions together for automatically retaining said collet in operative position, and supplemental tie means interconnecting the aforesaid hooking lever portions adapted to reenforce the tire side-wall retaining means against collet displacement.

2. A traction device adapted to be attached to a vehicle wheel equipt with a rim and a resilient tire providing for complementary side-walls, said device comprising a yoke-like collet adapted to transversely straddle and seat upon the tire tread, a manipulative lever pivotally associated with each of said collet end portions, each such lever having a hook element adapted to swing beneath said rim into interlocked operative position and further having a cam-like element adapted to impress a recess into one of the respective tire side-walls serving to initially draw one of the collet ends into seated position and each of which levers is further provided with a tail-piece, and supplemental tie means extending between said tail-pieces for lever interlocking purposes.

In testimony whereof I hereunto affix my signature.

JOHN R. VOSBURGH.